UNITED STATES PATENT OFFICE.

NELSON GOODYEAR, OF NEWTOWN, CONNECTICUT.

IMPROVEMENT IN THE MANUFACTURE OF INDURATED RUBBER FABRICS.

Specification forming part of Letters Patent No. 4,005, dated April 22, 1845.

*To all whom it may concern:*

Be it known that I, NELSON GOODYEAR, of Newtown, in the county of Fairfield and State of Connecticut, have invented a new, useful, and improved method of manufacturing india-rubber cloth and sheet india-rubber by impregnating the body of the cloth with emery, sand, or other suitable grit, or with filings of iron or other metals, or with other hard substances, thereby making a cloth or fabric firm and solid, and suitable for sheathing vessels, for covering floors, as carpeting, for the soles of shoes, and for many other uses for which cloth so prepared may be applied.

To enable others skilled in the art of manufacturing india-rubber cloth to make and use my improvement, I describe a mode or method of effecting the same, viz:

A suitable piece of plain cloth for a base being passed through the calender or rollers and charged with the gum in the usual manner, I then, while the gum is soft and adhesive, cover the surface with emery, sand, filings of metal, or other hard substances, and, passing the same again through the calender, thereby impregnate the grit with the gum, and by repeating the operation by alternate layers of gum and grit on one or on both sides of the cloth until a thickness solid and firmly impregnated and combined is obtained. The cloth or fabric thus made is a cheap and durable article, very suitable for the purposes above mentioned and many other uses, which I call "indurated india-rubber," a sample of which accompanies this specification.

I claim as my invention—

The method of rendering india-rubber fabrics solid and substantial for the uses and purposes mentioned by impregnating and combining the gum with grit, iron, or other metal filings or other hard substances, in the manner specified, and therefor I solicit Letters Patent.

NELSON GOODYEAR.

Witnesses:
SIMEON BALDWIN,
H. L. JOHNSON.